United States Patent [19]

Cano et al.

[11] Patent Number: 4,721,192
[45] Date of Patent: Jan. 26, 1988

[54] ANTI-THEFT DEVICE FOR VEHICLES

[76] Inventors: Roberto C. Cano, Calle 24, Blq. 41, #24, Santa Rosa, Bayamon, P.R., 00619; George Spector, 233 Broadway, Rm. 3815, New York, N.Y. 10007

[21] Appl. No.: 923,763

[22] Filed: Oct. 27, 1986

[51] Int. Cl.⁴ .............................................. B60R 25/08
[52] U.S. Cl. ........................... 188/353; 70/252; 180/287; 188/3 R; 303/89; 303/DIG. 3
[58] Field of Search ................. 180/287; 70/243, 253, 70/252; 188/353, 3 H, 265, 3 R; 303/89, DIG. 3, 7, 3, 10; 192/3 H; 280/775; 74/850, 477; 251/248, 249, 249.5, 250, 250.5; 137/385

[56] References Cited

U.S. PATENT DOCUMENTS

| | | | |
|---|---|---|---|
| 1,436,438 | 11/1922 | Cryer | 251/250.5 X |
| 2,245,958 | 6/1941 | Barr et al. | 192/3 H |
| 2,304,276 | 12/1942 | Peckworth | 70/243 X |
| 2,482,873 | 9/1949 | Roberts | 251/250.5 X |
| 2,601,909 | 7/1952 | Seppmann | 188/353 |
| 2,670,063 | 2/1954 | Reynolds | 188/353 X |
| 2,701,035 | 2/1955 | Leichsenring | 188/353 |
| 2,727,599 | 12/1955 | Melfi | 188/353 X |
| 2,740,009 | 3/1956 | Gaylord et al. | 188/353 X |
| 3,350,142 | 10/1967 | Schuman | 188/3 R X |
| 3,513,946 | 5/1970 | Rick | 188/353 |
| 3,617,663 | 11/1971 | Whittemore | 188/353 X |
| 3,688,879 | 9/1972 | Buletti | 303/89 X |
| 3,836,206 | 9/1974 | Leiber | 303/DIG. 3 |
| 3,862,781 | 1/1975 | King et al. | 303/DIG. 3 |
| 3,872,953 | 3/1975 | Taylor | 192/3 H X |
| 3,893,698 | 7/1975 | Fontaine | 303/89 |
| 3,919,868 | 11/1975 | Lipschutz | 70/243 X |
| 4,049,324 | 9/1977 | Cermak | 188/3 R X |
| 4,543,984 | 10/1985 | Murray | 251/248 X |
| 4,596,303 | 6/1986 | Tremblay | 180/287 |

FOREIGN PATENT DOCUMENTS 31750 5/1923 Netherlands ................. 70/252

Primary Examiner—Douglas C. Butler

[57] ABSTRACT

An anti-theft hydraulic brake device is provided and consists of a valve placed in hydraulic fluid conduit going from a master cylinder to wheel brake cylinders that will keep the brakes locked when the valve is activated from the dashboard after the brake pedal is released. In a modification the valve can be selectively operated from the key operated ignition switch as an additional safety factor.

3 Claims, 3 Drawing Figures

ANTI-THEFT DEVICE FOR VEHICLES

BACKGROUND OF THE INVENTION

The instant invention relates generally to motor vehicle brake systems and more specifically it relates to an anti-theft hydraulic brake device.

Numerous motor vehicle brake systems have been provided in prior art that are adapted to include an apparatus for energizing the brakes in a packed position to prevent theft of the motor vehicle. For example, U.S. Pat. Nos. 4,258,819; 4,446,950 and 4,546,846 all are illustrative of such prior art. While these units may be suitable for the particular purpose to which they address, they would not be as suitable for the purposes of the present invention as heretofore described.

SUMMARY OF THE INVENTION

A primary object of the present invention is to provide an anti-theft hydraulic brake device that will overcome the shortcomings of the prior art devices.

Another object is to provide an anti-theft hydraulic brake device that will keep the brakes locked when the device is activated from the dashboard after brake pedal is released.

An additional object is to provide an anti-theft hydraulic brake device that can be selectively operated from the key operated ignition switch for an additional safety factor.

A further object is to provide an anti-theft hydraulic brake device that is simple and easy to use.

A still further object is to provide an anti-theft hydraulic brake device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
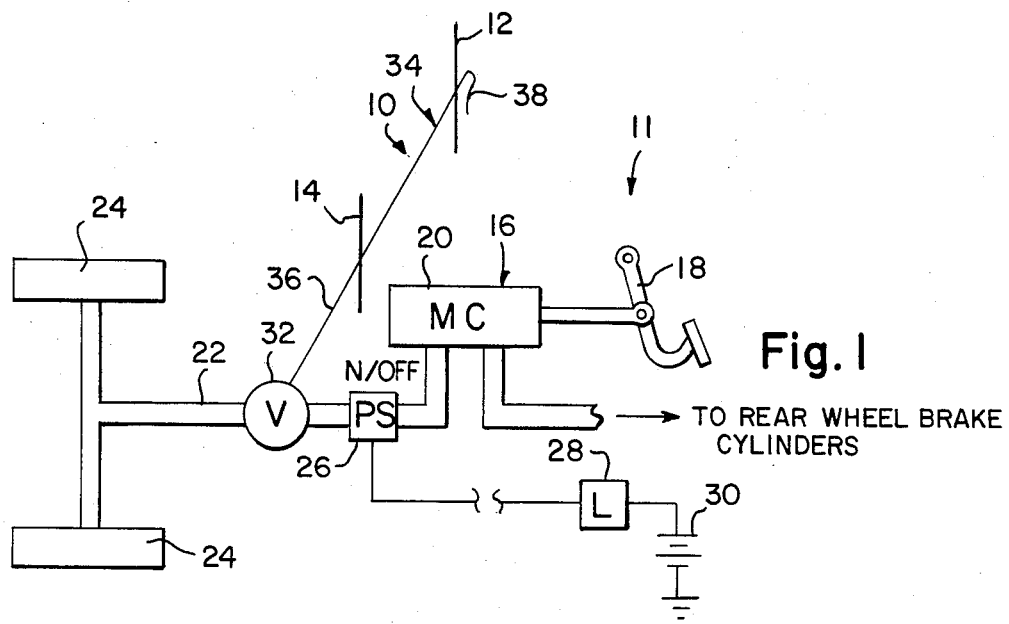
FIG. 1 is a partial electrical and hydraulic schematic diagram of the invention.

Turning now descriptively to the drawings, in which similar reference characters denote similar elements throughout the several views, FIG. 1 illustrates an anti-theft hydraulic brake device 10 for a motor vehicle 11 that has a dashboard 12, a fire wall 14 and a brake system 16 which has a brake pedal 18 connected to a master cylinder 20 with a conduit 22 extending from the master cylinder 20 to wheel brake cylinders 24. A normally off pressure switch 26 in the conduit 22 is electrically connected to brake lamps 28 and battery 30. The wheel brake cylinders 24 and the pressure switch 26 are responsive to depression of the brake pedal 18.

The device 10 consists of a valve 32 installed within the conduit 22 between the pressure switch 26 and wheel brake cylinders 24. A mechanism 34 for activating the valve 32 is located in the dashboard 12 and extends through the firewall 14 to keep the wheel brake cylinders 24 locked in position after the brake pedal 18 is released. The motor vehicle 11 cannot be driven until the valve 32 is deactivated.

The valve 32 is a fast acting ball valve which upon being turned will in one direction interrupt passage of hydraulic fluid in the conduit 22 to and from the wheel brake cylinders 24. When the valve 32 is turned in another direction it will allow passage of the hydraulic fluid in the conduit 22 to and from the wheel brake cylinders 24.

The activating mechanism 34 consists of an extension arm 36 extending downwardly from the dashboard 12 through the firewall 14 to the valve 32. A handle 38 is affixed on end of the extension arm 36 at the dashboard 12. The handle 38 has two key secured positions, being locked on and off, when turning the extension arm 36 and the valve 32.

Figure 2:
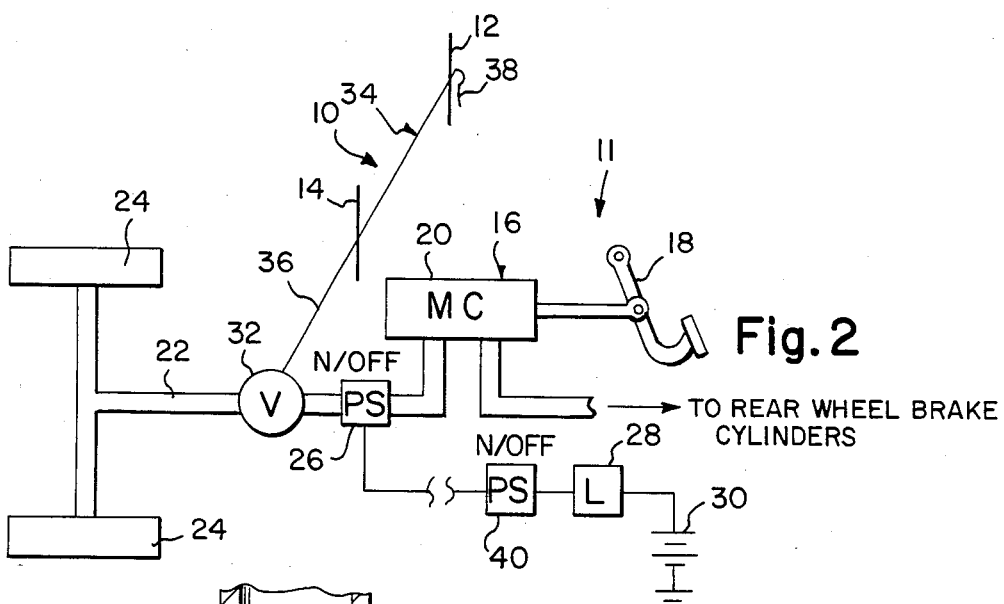
FIG. 2 is a partial electrical and hydraulic schematic diagram of a modification including two normally off pressure switches in series to turn the brake lamps off when the anti-theft device is in operation; the second switch provides to insure that the brake lamps are off.

In FIG. 2 a second normally off pressure switch 40 is in electrical series with the first normal off pressure switch 26 to insure that the brake lamps 28 are off when the valve 32 is turned on.

Figure 3:
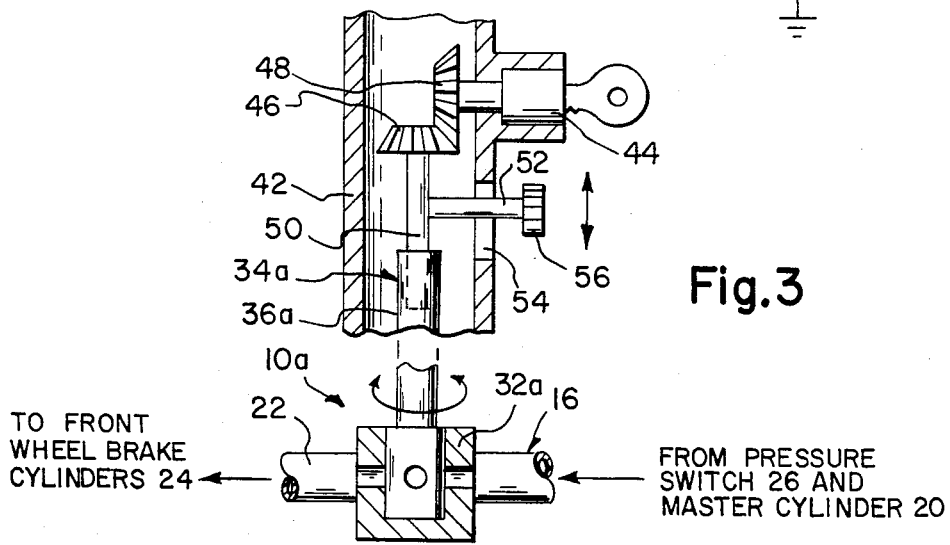
FIG. 3 is a cross sectional view with parts broken away of another modification in which the ignition switch will operate the anti-theft device valve.

FIG. 3 shows a modified anti-theft hydraulic brake device 10a for the motor vehicle that has a steering shaft 42 and a key operated ignition switch 44. The brake system 16 is the same as above. The device 10a consists of a valve 32a installed within the conduit 22 between the pressure switch 26 and wheel brake cylinders 24. A mechanism 34a for activating the valve 32a is located in the steering shaft 42 and extends to the valve 32a to keep the wheel brake cylinders 24 locked in position after the brake pedal 18 is released. The motor vehicle cannot be driven until the valve 32a is deactivated.

The activating mechanism 34a consists of a telescopic extension arm 36a extending up from the valve 32a through the steering shaft 42 adjacent the key operated ignition switch 44. A pair of mating bevel gears 46, 48 are provided. One of the bevel gears 46 is connected to upper end 50 of the telescopic extension arm 36a while other of the bevel gears 48 is connected to the ignition switch 44, whereby the ignition switch can operate the valve 32a. A post 52 extends transversely from the upper end 50 of the telescopic extension arm 36a through a slot 54 in the steering shaft 42. The post 52 has a knob 56 at free end thereof so as to selectively move the upper end 50 of the telescopic extension arm 36a up and down for engaging and disengaging the bevel gears 46 and 48, connecting the valve 32a to the ignition switch 44 and disconnecting the valve 32a from the ignition switch 44 as an additional safety factor.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An anti-theft hydraulic brake device for a motor vehicle having a steering shaft and a key operated ignition switch and a brake system having a brake pedal connected to a master cylinder with a conduit extending from the master cylinder to wheel brake cylinders and a normally off pressure switch in the conduit electrically connected to brake lamps and battery, the wheel brake cylinders and the pressure switch responsive to depression of the brake pedal, the device comprising:
   (a) a valve installed within the conduit between the pressure switch and wheel brake cylinders; and
   (b) means for activating said valve located in the steering shaft and extending to said valve to keep said wheel brake cylinders locked in position after the brake pedal is released so that the motor vehicle cannot be driven until said valve is deactivated wherein said activating means comprises
   (i) a telescopic extension arm extending up from said valve through the steering shaft adjacent the key operative ignition switch;
   (ii) a pair of matching bevel gears, one of said bevel gears connected to upper end of said telescopic extension arm while the other of said bevel gears being connected to the ignition switch whereby the ignition switch can operate said valve; and
   (iii) a post extending transversely from said upper end of said telescopic extension arm through a slot in the steering shaft, said post having a knob at free end thereof so as to selectively move said upper end of said telescopic extension arm up and down for engaging and disengaging said bevel gears, connecting said valve to the ignition switch and disconnecting said valve from the ignition switch as an additional safety factor.

2. An anti-theft device as in claim 1, wherein said activating means is connected to said ignition switch so that turning of said switch to one position blocks flow of fluid from the brake cylinder to the master cylinder and movement of said switch to another position permits flow from the brake cylinder to the master cylinder.

3. An anti-theft device as in claim 2, wherein said activating means is moveable to a position not connected to said switch.

* * * * *